May 10, 1966  F. SINGER ETAL  3,250,200
PHOTOGRAPHIC SHUTTER

Filed Nov. 13, 1963  6 Sheets-Sheet 3

May 10, 1966   F. SINGER ET AL   3,250,200
PHOTOGRAPHIC SHUTTER
Filed Nov. 13, 1963   6 Sheets-Sheet 5

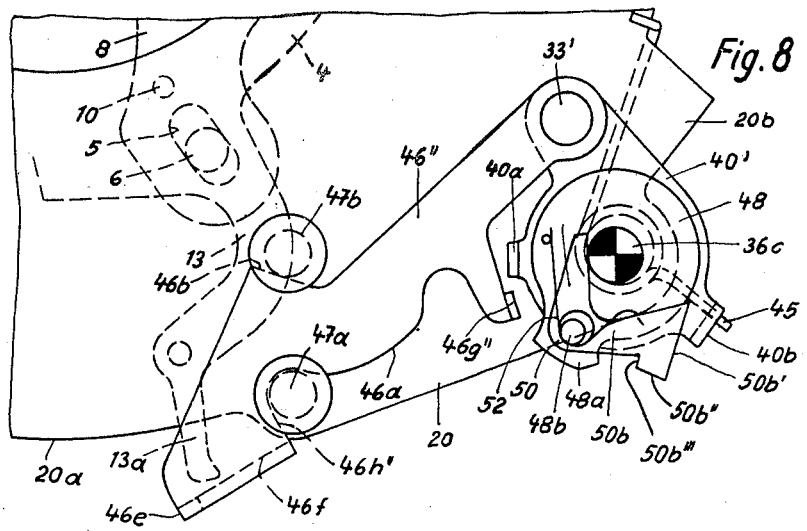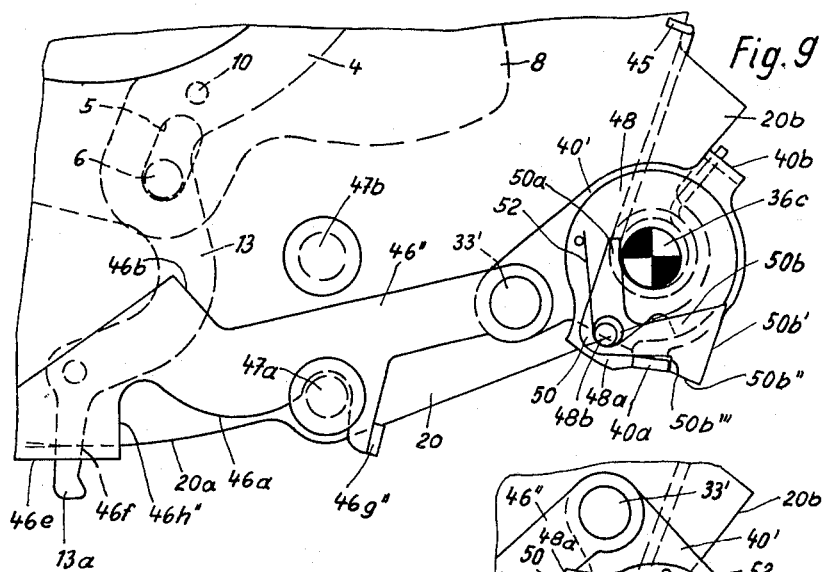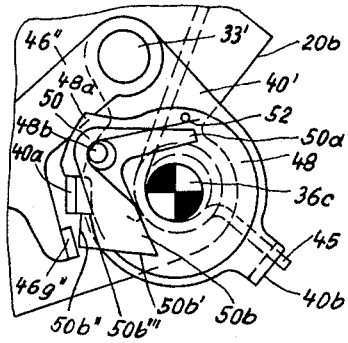

United States Patent Office 3,250,200
Patented May 10, 1966

3,250,200
PHOTOGRAPHIC SHUTTER
Franz Singer and Karl Hartl, Munich, Germany, assignors to Compur-Werk Gesellschaft mit beschrankter Haftung & Co., Munich, Germany, a German firm
Filed Nov. 13, 1963, Ser. No. 323,279
Claims priority, application Germany, Nov. 15, 1962, C 9,904, C 9,905; Jan. 30, 1963, C 10,138
4 Claims. (Cl. 95—63)

This invention relates to a photographic shutter, particularly but not exclusively a shutter for use on a camera of the type in which it is desired to have the shutter blades open for viewing or interim inspection, both before and after the actual exposure is made. A typical example of such a camera is what is called a single lens reflex camera, several kinds of such cameras being well known in the art.

An object of the invention is the provision of a generally improved and more satisfactory photographic shutter.

Another object is the provision of a shutter having improved means for opening the shutter blades for viewing or inspection purposes, and for subsequently closing the blades when an exposure is about to be made.

Still another object is the provision of means for opening the shutter blades for viewing or inspection, and subsequently closing them, in a positive manner from the driving mechanism which is in the camera body on which the shutter is used.

A further object is the provision of improved coupling means or transmission means between the blade operating parts in the shutter, and the driving parts in the camera body, which coupling or transmission means is so designed as to avoid undesired torsional effects.

A still further object is the provision of simple, compact, and inexpensive transmission means or coupling means operated by the operating parts in the camera body and acting directly upon a radial arm of the blade ring in the shutter casing, to transmit the necessary motions from the operating parts in the camera body to the blade ring, for opening and closing the blades for viewing purposes.

Another object is the provision of an improved form of shutter of the type having a shiftable shutter speed setting cam controlling an adjustable element of a retarding or delaying mechanism, so designed that the element is out of contact with the cam during the time that the cam is adjusted to set a different shutter speed, thereby reducing the wear on the parts and especially reducing the frictional resistance to movement of the speed setting cam.

These and other desirable objects may be attained in the manner disclosed as an illustrative embodiment of the invention in the following description and in the accompanying drawings forming a part hereof, in which:

FIG. 7 is an edge view of the portion of the shutter shown in FIG. 5, viewed in the general direction of the arrow A of FIG. 5;

FIG. 8 is a view similar to FIGS. 2 and 5, illustrating a third embodiment of the invention, the shutter blades being in closed position;

FIG. 9 is a view similar to FIG. 8, but with the parts moved to a position wherein the blades are open; and FIG. 10 is a view similar to a fragment of FIGS. 8 and 9, with the illustrated parts in an intermediate position.

Figure 1:
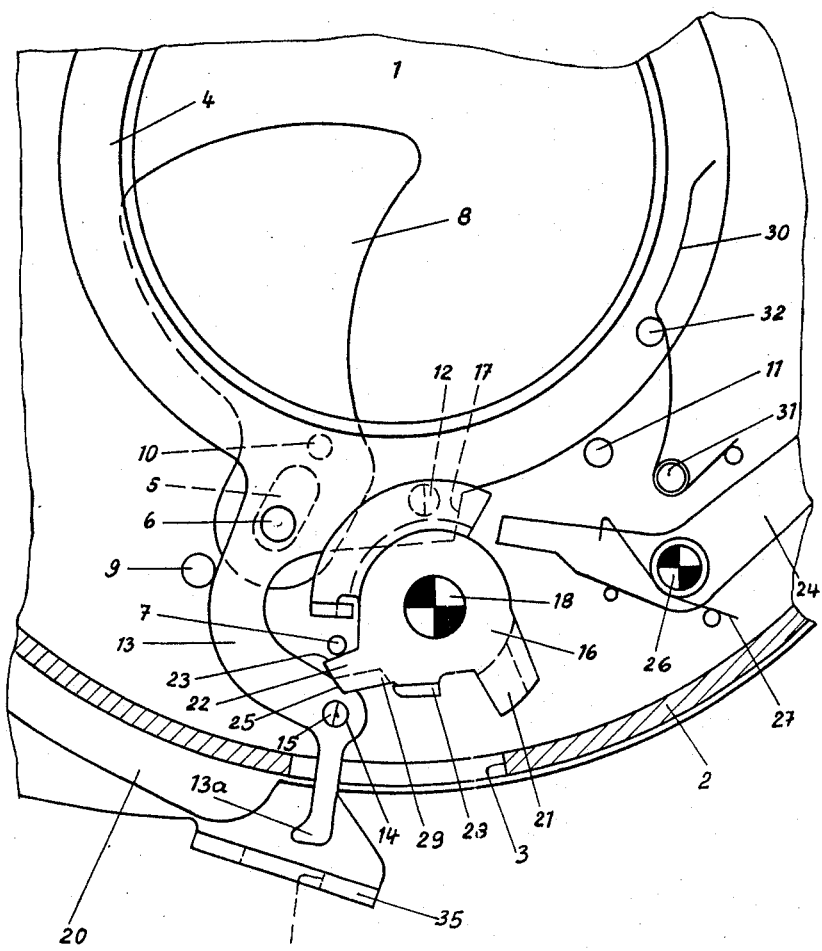
FIG. 1 is a fragmentary front face view of a shutter in accordance with one embodiment of the present invention, with the cover plate removed in order to show the construction beneath, and with many other parts unnecessary to an understanding of the present invention omitted for the sake of clarity, the shutter being shown with the blades closed.

As mentioned above, the present construction is intended for use primarily, but not exclusively, on a camera, such as a single lens reflex camera, in which it is desired to have the shutter blades and diaphragm leaves fully open for viewing or inspection purposes, prior to making the actual exposure, and again as soon as the actual exposure is completed. Of course the film must be protected from undesired light while the shutter blades are open for such viewing and inspection, and this is ordinarily accomplished by the reflex viewing mirror, with or without a supplementary protective flap or plate. In some cameras of this general type, the shutter blades remain closed after the making of an exposure, until the shutter is cocked or tensioned ready for the next exposure (this normally being done simultaneously with and by the act of winding the film) and then are opened for viewing or inspection when the shutter is tensioned. It is preferable, however, to have the shutter blades open for viewing immediately after the exposure, without waiting for the next film winding or shutter tensioning operation In the preferred construction, therefore, the sequence of operation is as follows: assuming that the film has been wound and the shutter has been tensioned ready for the next exposure, the shutter blades (and the diaphragm leaves) will be wide open, the reflex mirror (and the protective flap, if one is used) will be in viewing position, and the image or view can be seen on the focusing screen. When the shutter is tripped or released to make an exposure, the shutter blades are closed; simultaneously with the closing of the shutter blades, the diaphragm leaves are stopped down to the preselected size of aperture; then the reflex mirror is shifted to exposure position, and likewise the protective flap, if there is one; then the shutter blades are opened to make the exposure, and closed again to terminate the exposure; then the reflex mirror (and protective flap, if any) is moved from exposure position to viewing position, thereby protecting the film from further light; then the shutter blades are fully opened and the diaphragm leaves are fully opened, so that the scene or view can once more be observed on the viewing screen. All of this takes place much faster than it can be described. The film winding mechanism is then operated, to wind a fresh area of film into the focal plane, and simultaneously therewith the shutter mechanism is tensioned or cocked. However, in the preferred construction, this does not affect the shutter blades, diaphragm leaves, or reflex mirror, since these parts have already moved to their respective viewing positions promptly after the completion of the exposure, without waiting for the next tensioning or film feeding operation.

In some prior shutters, two rotatable blade rings are used, one of them being rotated when the blades are to be opened for viewing purposes, and the other being rotated when the blades are to be opened for the actual exposure. It is preferred, however, to use only a single blade ring rather than two, thereby somewhat simplifying the construction, and only a single blade ring is necessary when the mechanism of the present invention is used.

The camera body contains operating mechanism of known form for shifting the reflex mirror back and forth between its respective viewing and exposure positions, and the problem with which the present invention mainly deals is the problem of providing simple and satisfactory coupling mechanism or transmission mechanism deriving its motion from the above mentioned known operating mechanism in the camera body, and effective to cause the desired movements of the shutter blades for viewing purposes, without causing torsional stresses or binding distortions such as have sometimes occurred with prior constructions.

Since the present invention does not deal with the operating mechanism within the camera body, but rather with the transmission means deriving its motion from the operating mechanism in the camera body, the operating mechanism itself is not illustrated. Suitable forms of such operating mechanisms are known to those skilled in the art, and are disclosed, for example, in published German specification No. 1,138,618, and in the copending United States patent application of Franz Singer, Serial No. 174,935, filed February 23, 1962, Patent No. 3,122,078 issued Feb. 25, 1964. The present invention may be regarded as an improvement upon the constructions disclosed in the German specification and United States application above identified, the United States application being hereafter referred to as the "prior application."

Figure 2:
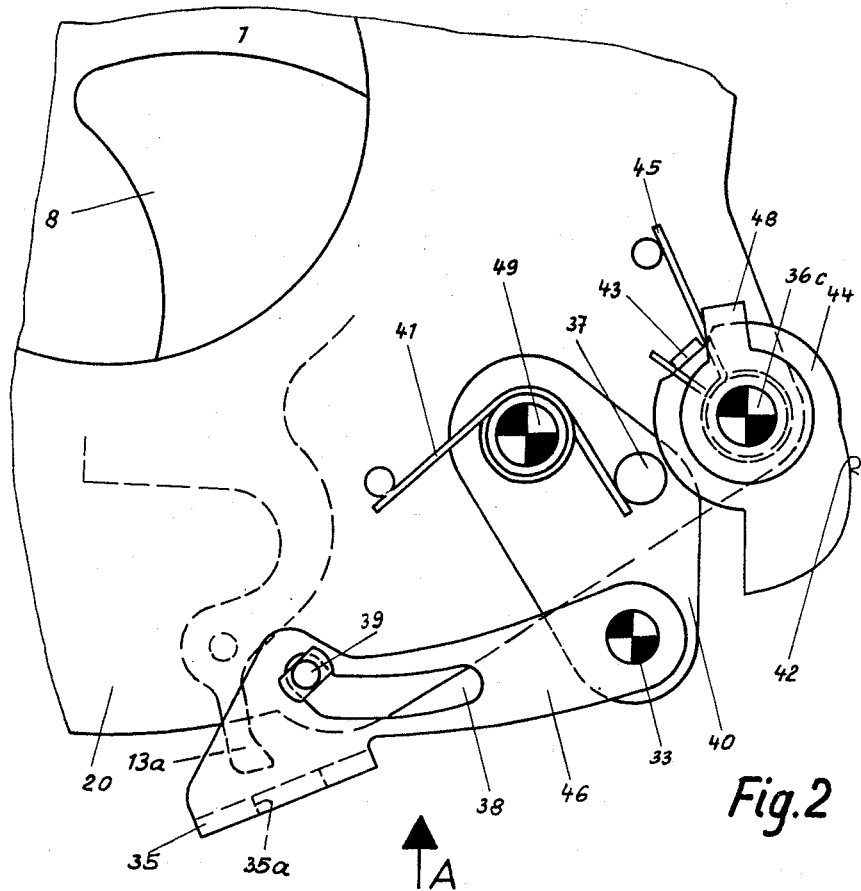
FIG. 2 is a fragmentary rear view of the shutter, likewise with omission of many parts unnecessary to an understanding of the invention.
Figure 3:
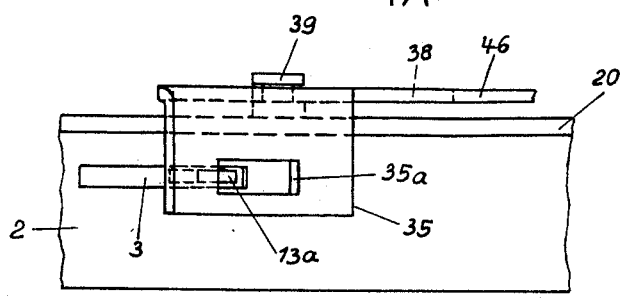
FIG. 3 is an edge view of certain parts illustrated in FIG. 2, viewed in the direction of the arrow A in FIG. 2.

Referring now to the drawings of the present application, and particularly at the outset to FIGS. 1–3, the present construction comprises the usual objective shutter casing or housing of annular form, shown in general at 2, surrounding the central exposure aperture 1. The outer circumferential wall of the casing has a circumferentially extending slot 3 for receiving an outwardly extending end of an arm on the blade ring 4 which, as usual, rotates about the optical axis as a center. The shutter has any desired number of shutter blades 8, there usually being about five of such blades, but more or less can be used if desired. Only one blade is illustrated in the drawings, for the sake of clarity, but those skilled in the art will understand that the various blades overlap with each other when they are in their respective closed positions, so as to prevent entrance of light through the exposure aperture 1.

Each blade 8 is pivoted in the conventional manner on a bearing pin 10, the respective bearing pins (one for each blade) being secured to the base plate of the shutter. Each blade also has a cam slot 5, engaged by a pin 6 on the blade ring which projects into the cam slot in the well known manner, in such fashion that when the blade ring 4 is turned counterclockwise from the position shown in FIG. 1, all of the blades will be simultaneously swung to their open positions, and when the blade ring is turned back in a clockwise direction, they will all be closed.

The rotary movement of the blade ring is limited by stop pins 9 and 11 in fixed position in the shutter casing. The blade ring has a radial arm 13, the clockwise edge of which (when viewed from the front as in FIG. 1) engages the pin 9 to limit motion of the ring in a clockwise direction. It also has an abutment edge 17 which bears against the pin 11 to limit motion in a counterclockwise direction. The blade ring carries an axially yielding opening pin 12 and an axially yielding closing pin 14 which is beveled at one side as at 15, the pin 14 being mounted on the arm 13.

A main driving member or master member 16, of known construction, is mounted on the shaft 18 and cooperates with the pins 12 and 14 to drive the blade ring 4 first in one direction and then in the opposite direction, for making an exposure. The master member may be of the same form shown, for example, at 58 in FIGS. 9–14 of said prior application 174,935, which is essentially the same form of master member disclosed in Singer Patent 2,785,612, granted March 19, 1957. As usual, the master member is rotatable about its shaft 18 and is subject to the action of a driving spring or master spring (not here shown, but shown and described both in said prior application and in the patent just mentioned) which biases the master member in a clockwise direction when viewed from the front as in FIG. 1. It has a radial opening lug or projection 21, and a radial closing lug or projection 22, which coact in known manner with the pins 12 and 14, respectively, during the running down movement of the master member in a clockwise direction from its tensioned or cocked position to its rest or run down position. The closing lug 22 has a radial operating edge 23 and a circumferential or peripheral edge 25 which is concentric with the axis of rotation of the master member. It also has a beveled portion 29 on its under surface. In the rest or run down position, the edge 23 lies against a fixed abutment pin 7 secured in the casing or housing 2.

The master member 17 can be turned in a counterclockwise direction to its tensioned or cocked position, by driving means not illustrated here, but well understood in the art and disclosed, for example, in said prior application and elsewhere. It is releasably latched in its tensioned or cocked position by a latching lever 24 rotatable on a fixed pin 26 and biased in a counterclockwise direction by a spring 27. When the master member reaches its tensioned position, the end of the latch 24 drops behind a lug 28 on the master member, this lug 28 being disposed in a plane different from that of the lugs 21 and 22.

In FIG. 1 the shutter is shown in its rest or run-down condition, with the blades closed. A weak spring 30 mounted on a fixed pin 31 engages a pin 32 on the blade ring 4 to prevent unintentional rotation of the blade ring in an opening direction.

FIG. 2 views the shutter from the rear, so the corresponding parts are reversed in aspect as compared with FIG. 1. As shown in FIGS. 2 and 3, there is a retaining plate 20 secured to the rear side of the shutter casing. A radially extending end 13a of the arm 13 on the blade ring 4 extends out through the previously mentioned circumferential slot 3 of the shutter casing 2. An opening pawl 46 is pivoted at 33 to the outer end of a lever 40, the inner end of which is pivoted at 49 to the retaining plate 20. This opening pawl 46 has a cam slot 38, into which extends a slide pin 39 fixed to the retaining plate 20. The free end of the pawl 46 (that is, the end remote from the pivot 33) is formed as a lug or flange 35 which extends forwardly in a plane parallel to the optical axis, and is provided with an entraining opening 35a which enables it to engage and disengage the outwardly projecting end 13a of the arm on the blade ring. The engagement and disengagement movement of the flange 35 with respect to the arm 13a is determined by the shape of the cam slot 38.

A spring 41 tends to turn the lever 40 in a counterclockwise direction when viewed from the rear as in FIG. 2, and thus tends to pull the pawl 46 rightwardly away from the radial arm 13a of the blade ring. Because of the shape of the cam slot 38, engaging the fixed pin 39, the flange or lug 35 at the left end of the pawl 46 is swung outwardly away from the optical axis as the pawl reaches the rightward limit of its travel, this being the position shown in FIG. 2. In this position, the lug or flange 35 is entirely out of contact with the end 13a of the blade ring arm, and does not interfere in any way with the motion of the blade ring. As the pawl 46 is moved leftwardly from the extreme rightward position shown in FIG. 3, the flange 35 will move not only leftwardly but also inwardly toward the center of the shutter (that is, toward the optical axis) and the flange will embrace the end 13a, which will then extend into the opening 35a. This will form an operative connection between the pawl 46 and the arm of the blade ring, so that continued leftward movement of the pawl 46 will cause corresponding leftward movement of the end 13a of the blade ring (or rightward movement when viewed from the opposite direction as in FIG. 1) and will open the shutter blades. This is a movement for viewing or inspection purposes, not the movement for actual exposure purposes.

The lever 40 has a pin 37 which bears against the cam edge 42 of a cam piece 44 which is mounted for free rotation on a shaft 36c. The cam piece 44 has an upstanding ear or lug 43, which can be engaged by an arm on an entraining disk 48 fixed to the shaft 36c to turn therewith. A spring 45 biases the cam piece 44 in a clockwise direction, tending to keep the lug 43 engaged with the arm on the member 48.

The operating mechanism for rotating the shaft 36c in properly timed relation to the movements of the reflex mirror from viewing position to exposure position and vice versa, is of the conventional kind known in the art and so need not be illustrated or described in detail here. It is sufficient here to say that the shaft 36c is operatively coupled in a conventional way to the operating mechanism in the camera body, being driven for example from the front end 40c' of the shaft 40 illustrated and described in said prior application, in the same or approximately the same way that the gear 104a in said prior application is driven from the above mentioned shaft 40 of said application. As will be understood by those skilled in this art, rotary movement of the shaft 36c commences when the shutter release or trigger is operated, and proceeds initially in a clockwise direction (when viewed from the rear as in FIG. 2) before the actual exposure takes place, and then returns in a reverse or counterclockwise direction after the exposure has been completed. Thus the shaft 36c may be described as one of the members which couples the shutter blade opening device of the shutter structure to the operating mechanism or operating gear of the camera structure, and to the reflex mirror and to the objective diaphragm.

The shape of the cam piece 44 is so designed that the operative movements of the parts in the camera structure and the parts on the shutter structure are correlated or synchronized with each other in proper timed sequence. The cam piece 44 has a cam edge 42 which, as seen in FIG. 2, is of constant radius over a first section, and then in the second section of the cam edge, the radius increases.

In order to permit the opening of the shutter blades for viewing promptly after the completion of the exposure, it is essential that the blade ring be liberated or disconnected promptly from the master member. This is made possible by the fact that the closure lug 22 of the master member 16 passes on beyond the closure pin 14 at the end of the running down movement of the master member. For a brief instant just as the shutter blades reach their fully closed position, and just as the pin 14 slips off of the radial edge 23 of the master member, the circumferential edge 25 is opposite the pin 14 and prevents any rebound of the blade ring by reason of the arm of the blade ring hitting the stop pin 9. But as soon as the danger of rebound has passed, the edge 25 passes on beyond the pin 14, thereby freeing the blade ring for quick opening movement as soon as the reflex mirror has moved to its viewing position, protecting the film from light.

The opening movement of the shutter blades, for viewing, commences when the rising section of the cam edge 42 of the cam piece 44 reaches the pin 37 on the lever 40 and begins to swing the lever leftwardly, in a clockwise direction on its pivot 44. This swinging of the lever 40 carries the pawl 46 leftwardly with it. As above explained, the initial part of the leftward movement of the pawl 46 causes the lug or flange 35 to embrace the end 13a of the arm on the blade ring, and then the further leftward movement of the pawl 46 carries this arm of the blade ring leftwardly when viewed from the rear as in FIG. 2, or rightwardly when viewed from the front as in FIG. 1, opening the shutter blades to the fully opened position wherein the edge 17 on the blade ring engages the stop pin 11. As already explained, the reflux mirror has meanwhile been moved to its viewing position, protecting the film, this motion being completed prior to the beginning of opening of the shutter blades.

While the shutter blades are open for viewing, the master member 16 is turned in a counterclockwise direction from its rest or run down position shown in FIG. 1 to its tensioned or cocked position. The mechanism for tensioning the master member is well understood in the art and not here shown. During this tensioning movement, the closing lug 22 of the master member passes over the closing pin 14 (since this pin is now in a position to the right of the position shown in FIG. 1) but this movement is possible without damage to the parts, because the beveled portion 29 of the master member engages the beveled portion 15 of the pin 14 and depresses this pin in a direction parallel to the optical axis, in known manner, against the action of a spring which tends to project the pin 14 into the plane of rotation of the arm 22.

At the start of the next exposure cycle, but before the actual exposure itself, the blades are once more closed, after which the reflex mirror is moved from viewing position to exposure position, and then the shutter blades are opened and closed by operation of the master member 16, for making the actual exposure. The closing of the blades from viewing position, preparatory to the actual exposure, occurs when the shutter release or trigger is operated, and the operating mechanism or operating gear in the camera causes the shaft 36c to turn in a clockwise direction when viewed as in FIG. 2. Previous to the commencement of this turning, the cam 42, 44 was so positioned that the pin 37 was on a high part of the cam. Therefore, when the cam turns from such position, the pin 37 rides down the slope of the cam edge 42 from the high part to the low part, and the spring 41 swings the lever 40 correspondingly to the right, pulling the pawl 46 rightwardly and pulling the blade ring arm 13a to close the shutter blades. At the end of the closing movement, the flange 35 moves outwardly away from the center of the shutter, sufficiently to release the end 13a of the arm from the opening 35a in the flange. As a result, the blade opening device is fully disengaged from the blade ring 4, and the blade ring is now free to be operated in the usual manner by the master member 16.

Figure 4:
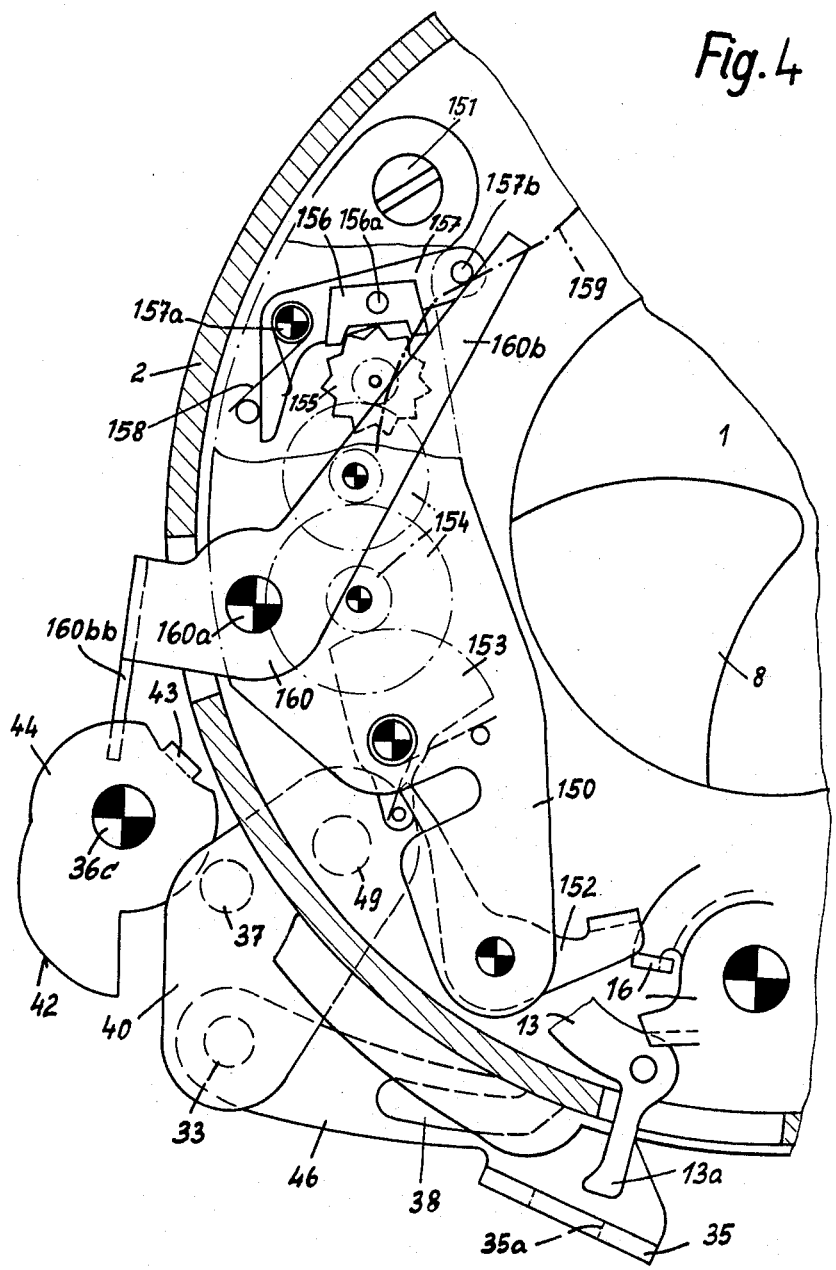
FIG. 4 is a front face view of the shutter, with the cover plate and various other parts omitted, showing certain portions of the shutter further to the left of the portions shown in FIG. 1, and particularly illustrating the delaying or retarding mechanism for timing an exposure, and the mechanism for moving an element thereof out of contact with the speed adjusting cam.

Another feature of the present invention is best illustrated in FIG. 4 of the drawings. This relates to the control of the speed or duration of the exposure. A speed setting member, sometimes adjustable manually, and sometimes coupled to a photoelectric exposure meter, has a cam which adjusts the degree of engagement of a vibrating anchor or pallet with a star wheel or escapement wheel which is part of the retarding gear train, thereby altering the extent to which the retarding gear train will retard the operation of the shutter during an exposure. In conventional shutters, the member which controls the degree of engagement of the vibrating anchor is constantly in contact with the controlling cam which is moved by the setting member. This leads to undesirable friction between the parts, when the setting is adjusted, this friction being undesirable in any event but especially undesirable in situations where the cam is not moved by direct manual force but rather by the slight force exerted by a photoelectric exposure meter.

According to an aspect of the present invention, the member which is controlled by the setting cam is out of contact with the cam at all times when the cam is moved to change the setting. Thus whenever the shutter speed setting is changed, whether manually or by an exposure meter, there is no friction between the setting cam and the part controlled thereby, since these parts are out of contact. It is only during the exposure cycle itself that the part controlled by the cam is brought into contact with the cam, so as to be responsive to the set position of the cam.

Referring now to FIG. 4, the retarding mechanism is mounted between two plates 150 which are slightly spaced from each other in the direction of the optical axis and which are mounted within the annular part of the shutter casing, held therein by screws 151. The mechanism includes a transmission lever 152 pivoted between the two plates 150, one arm of the transmission lever being in a position to be engaged by an upstanding lug on the master member 16 as the master member runs down from its tensioned position to its rest position. The running down movement of the master member swings the transmission lever 152 in a counterclockwise direction on its pivot, so that the second arm of the transmission lever engages an arm on a gear segment 153 and swings the gear segment in a clockwise direction on its pivot. This, in turn, swings various intermediate transmission gears collectively indicated at 154, the gear train ending in a star wheel or escapement wheel 155, which is engaged by a vibrating anchor or pallet 156 pivoted at 156a to a lever 157 pivotally mounted at 157a and urged in a clockwise direction on this pivot by a spring 158. The action of the spring tends to engage the anchor 156 more deeply with the star wheel 155, to the extent permitted by the engagement of a pin 157b on the lever 157 with the cam edge 159 of the setting member. The cam edge is shown only schematically by a dot dash line, as the cam is on a setting member which rotates about the optical axis of the shutter, near the front thereof, the member itself being conventional and not illustrated.

In the conventional construction, the spring 158 constantly holds the pin 157b against the cam edge 159, thereby producing friction between the cam edge and the pin, whenever the speed setting member is adjusted to a new position. In the present construction, however, there is what may be called a cut-out lever 160 pivotally mounted at 160a on the upper plate 150, and provided with two arms. The first arm 160b lies against the pin 157b of the speed regulating lever 157. The second arm 160bb extends out through a slot in the side wall of the shutter casing and projects into the path of movement of the lug or ear 43 on the cam piece 44 which has previously been described in connection with FIG. 2.

It will be recalled from the previous description that, immediately after the completion of an exposure, the shaft 36c and the cam piece 44 turn in a counterclockwise direction when viewed from the rear as in FIG. 3, or in a clockwise direction when viewed from the front as in FIG. 4, so that the cam edge 42 on the cam piece 44 acts on the pin 37 to swing the lever 40 and push the pawl 46 to a blade-opening position for viewing, and it will also be recalled that the parts stay in this position and do not return to blade-closed position until the exposure cycle has been initiated for making a new exposure. As the shaft 36c and the cam 44 turn, the ear 43 on the cam engages the arm 160bb on the lever 160 and swing the lever in a conterclockwise direction (viewed as in FIG. 4) on its pivot 160a, so that the second arm 160b engages the pin 157b of the timer adjusting lever and swings this pin out of contact with the cam edge 159. The lever 160 and lever 157 are held in these respective positions so long as the shutter blades remain open for viewing. Thus the shutter speed setting member can be adjusted to a different shutter speed, without any frictional resistance from contact with the speed adjusting lever 157. Only at the beginning of the next exposure, when the speed setting adjustment has been completed, do the parts 36c and 44 move back to a position which releases the counterclockwise force on the lever 160 and allows the spring 158 to move the adjusting lever 157 so that its pin 157b comes into contact with the cam edge 159, at the same time bringing the anchor 156 into such depth of engagement with the star wheel 155 as is permitted by the shape of the cam 159.

The action of the retarding gear train in delaying the running down movement of the master member, thereby determining the duration of the exposure, is well understood in the art and need not be described in detail here. It is sufficient to say that between the time that the master member opens the blades and the time that it closes the blades at the termination of the exposure, the master member engages and must displace the transmission lever 152, and this transmission lever can be displaced only as fast as permitted by the running down resistance of the gear train 153, 154, 155, the resistance of which is varied by the depth of engagement of the vibrating anchor 156 with the star wheel or escapement wheel 55.

Figure 5:
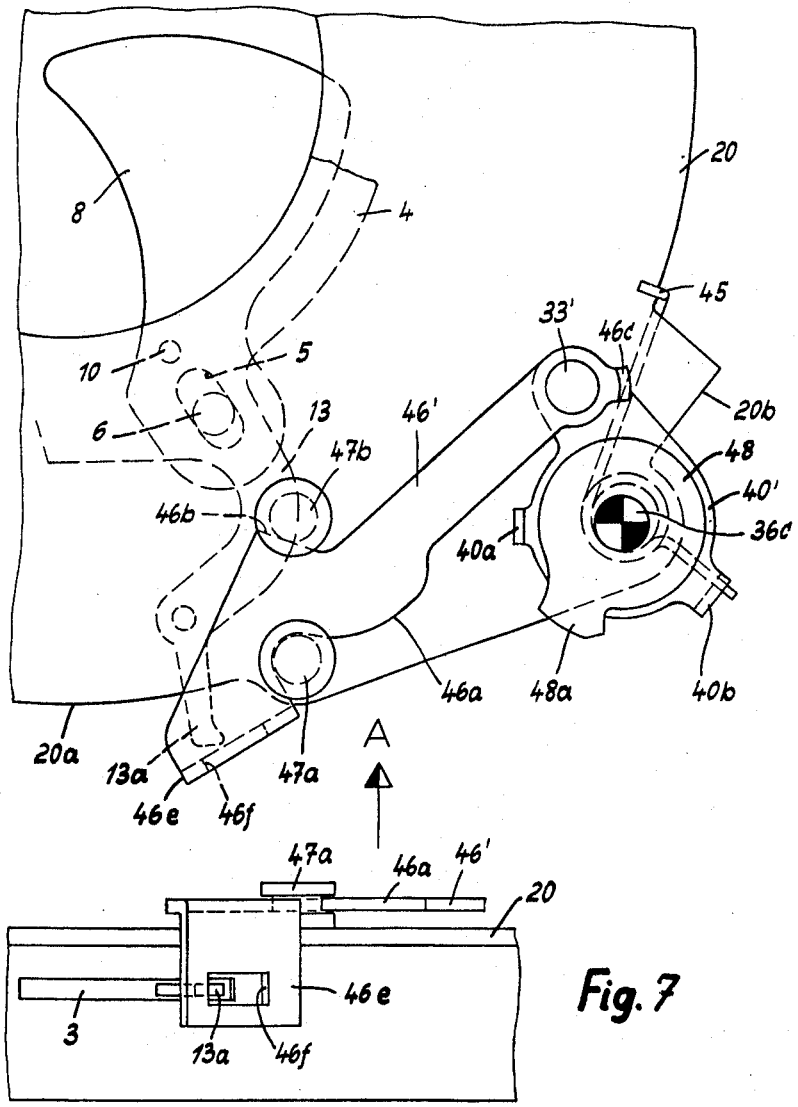
FIG. 5 is a view similar to FIG. 2, illustrating a second embodiment of the invention.
Figure 6:
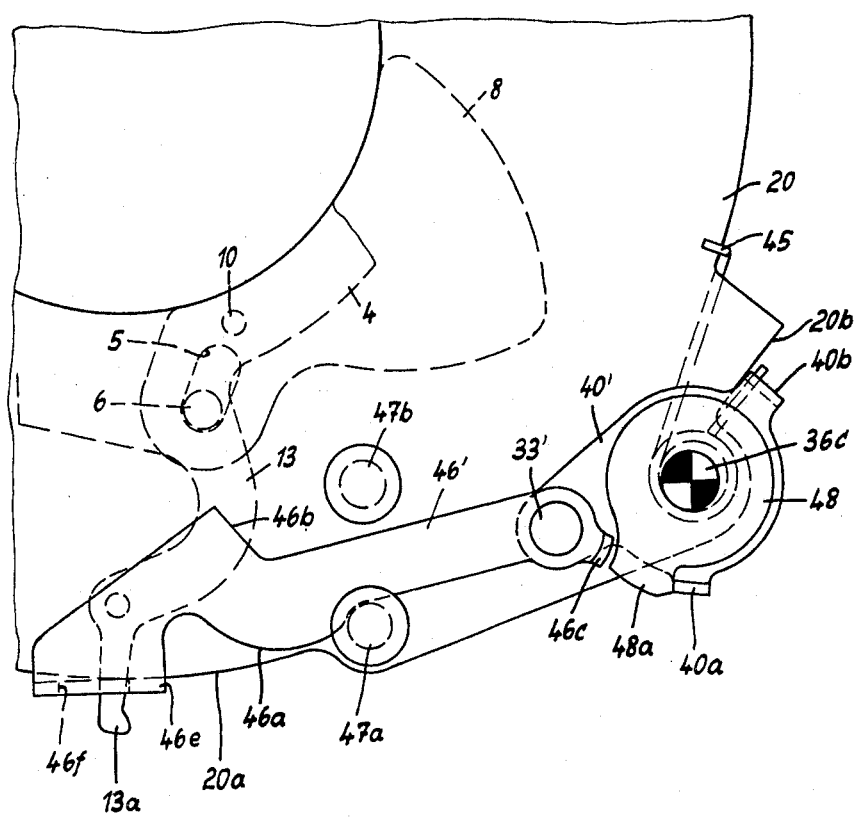
FIG. 6 is a view similar to FIG. 5, but showing the parts in a different position, with the shutter blades fully open for viewing or inspection.

A second embodiment of the present invention as illustrated in FIGS. 5, 6, and 7. Many of the parts are identical or substantially identical with those of the first embodiment, and for such parts the same reference numerals have been used as in the first embodiment, no further description being necessary. The difference, in this second embodiment, is in the shape of the actuating pawl 46 and in the way that the pawl is driven from the rotation of the shaft 36c.

The retaining plate 20, at the rear of the shutter as in the previous embodiment, has an operating edge 20a and an abutment edge 20b. The blade opening pawl, similar to but slightly different from the pawl 46 in the first embodiment, is here designated as 46'. It is pivoted at 33' to a laterally extension on a plate 40' which is mounted for rotation on the shaft 36c or on a separate pivot on the plate 20 alined with the shaft 36c. The pawl or link 46' has an operating cam edge 46a which cooperates with a guide pin 47a on the plate 20, and a second cam edge 46b which cooperates with a second guide pin 47b on the plate 20. It also has a rearwardly bent lug 46c at its right end close to the pivot 33'.

At its left end, the member 46' is formed with a forwardly bent flange or lug 46e, parallel to the optical axis, and containing an opening 46f, these parts being similar to the flange 35 and opening 35a in the first embodiment, and serving the same purpose of engaging and entraining the radially projecting arm 13a of the blade ring. The parts are so shaped that when the pawl or link 46' is at the right limit of its motion, it is free of the arm 13a on the blade ring, as shown in FIG. 5, but when it is moved leftwardly, the shape of the cam edge 46a in cooperation with the pin 47a will cause the flange 46e to move upwardly as well as leftwardly, so that the arm 13a of the blade ring becomes engaged in the opening 46f of the flange 46e. Upon further leftward movement, the upper edge of the link 46' leaves the pin 47b as shown in FIG. 6, but the upper surface of the flange 46f rides along the control edge 20a of the plate 20, thereby holding the left end of the link against swinging upwardly, while the pin 74a holds it against swinging downwardly.

The plate 40' to which the link 46' is pivotally connected, has a first rearwardly bent lug 40a, and a second forwardly bent lug 40b. A spring 45 engages the lug 40b and tends to turn the plate 40' in a clockwise direction, thereby tending to draw the link 46' rightwardly to its limit position shown in FIG. 5, wherein the engagement of the cam surface 46b with the pin 47b as well as the engagement of another part of the pawl with the pin 47a serves to prevent any further rightward movement of the link.

Just to the rear of the plate 40' is the entraining disk 48 fixed to the shaft 36c to turn therewith. The entraining disk has an entraining arm 48a. Just as described in connection with the first embodiment, the shaft 36c is turned by the operating mechanism within the camera, in timed relation to the movements of the reflex mirror and other parts.

FIG. 5 illustrates the parts of the opening device at the conclusion of the exposure, but before the shutter blades have again been opened for viewing. The shaft 36c is then turned (by the above mentioned operating mechanism within the camera body) in a counterclockwise direction. This carries the entraining disk 48 along in the same direction, and after a rotary motion of about 185 degrees from the initial position shown in FIG. 5, the entraining arm 48a reaches and slips past the lug 46c on the pawl 46'. Continuing the counterclockwise movement, the lug 48a then makes contact with the lug 40a on the plate 40', after approximately 270 degrees of angular rotation from its initial starting position. Thus through approximately 270 degrees of rotation of the shaft 36c, such rotation does not cause any movement of the blade opening pawl or link 46', and during this interval there is sufficient time for the reflex mirror (and the protecting flap, if a separate flap is used) to move from exposure position to viewing position wherein the film is protected against further access of light. It is only at this stage that the lug 48a engages the lug 40a and then starts to cause corresponding counterclockwise rotation of the plate 40' against the force of the spring 45. This counterclockwise rotation of the plate 40' continues until the forwardly bent lug 40b thereof encounters the abutment edge 20b on the plate 20, which forms a limit stop for this motion. This occurs when the shaft 36c has completed approximately one full turn or 360 degrees of rotation, as will be observed by comparing FIG. 5, showing the initial position, with FIG. 6, showing the final position at the end of such rotation.

Because of the pivotal connection 33' of the plate 40' and the link or pawl 46', the pawl will be moved leftwardly and during such motion the flange 46e will surround and entrain the arm 13a of the blade ring, as already described, moving the blade ring arm in a leftward direction to open the shutter blades to the position shown in FIG. 6, for viewing purposes. The parts remain in this position during the subsequent tensioning or cocking of the shutter ready for the next exposure, and right up until the instant of release of the shutter trigger for initiating the next exposure.

Upon operation of the shutter release or trigger, the operating mechanism within the camera causes the shaft 36c to turn or run down in a clockwise direction when viewed from the rear as in FIGS. 5 and 6. At the beginning of this running down movement, the entraining arm 48a engages the lug 46c of the link or pawl 46', and thus positively pulls the pawl 46' rightwardly and turns the plate 40' clockwise. During this movement, there is a positive drive caused by the engagement of the parts 48a and 46c, so that the shutter blades are closed quickly from the open viewing position to the fully closed position, and it is not necessary to rely merely on the power of the light spring 45 to produce the closing movement. At the end of the closing movement of the blades, the flange 46e frees the arm 13a of the blade ring, and the control cam surface 46b makes contact with the guide pin 47b, stopping further rightward movement. The blade opening device is thus completely separated again from the blade ring, and the spring 45 holds the parts in this working position. During the further clockwise rotation of the shaft 36c, the entraining arm 48a slides away from the lug 46c, and the entraining disk 48 together with the shaft 36c resume their initial starting positions. During this time, the reflex mirror is swung from viewing position to exposure position. Finally, the latch of the master member 16 is operated and the master member runs down from tensioned position to rest position, opening the shutter blades and closing them again to make the exposure. Then the operating mechanism within the camera turns the shaft 36c once more in a counterclockwise direction, again moving the parts from the FIG. 5 position to the FIG. 6 position as above described.

A third embodiment of the invention is illustrated in FIGS. 8, 9, and 10. This is quite similar to the construction just described in connection with FIGS. 5, 6, and 7, and the parts in the third embodiment which are essentially the same as those in the second embodiment have been given the same reference numerals, further description of such corresponding parts being unnecessary.

In contrast to the second embodiment, the third embodiment utilizes a double armed pawl 50 rotatably mounted on a pin 48b on the entraining disk 48, which is otherwise essentially the same as the entraining disk 48 in the second embodiment, except for carrying this pawl 50. One arm of the pawl is designated 50a. The other arm 50b has an operating edge 50b', a second operating edge 50b'', and an entraining edge 50b'''. A torsion spring 52 wound around the pivot pin 48b tends to turn the pawl 50 in a clockwise direction on its pivot, the limit of motion in this direction being determined by engagement of the arm 50a of the pawl with the shaft 36c as shown in FIGS. 8 and 9.

The blade opening pawl or link 46'' is quite similar to the previously described pawl 46', and most of its parts are the same, but it has a rearwardly bent lug 46g'' and an abutment edge 46h''. As in the previous embodiment, the right hand end of the pawl 46'' is pivoted at 33' to the plate 40'.

This third embodiment of the invention operates as follows: FIG. 8 illustrates the parts in the same relative position in which FIG. 5 illustrates the parts of the previous embodiment; that is, in a position immediately following the completion of an exposure, before the shutter blades have been opened for viewing. At the completion of the exposure, the shaft 36c begins to turn counterclockwise, as was previously described in connection with the previous embodiment. The entraining plate 48, being rigidly fastened to the shaft 36c, turns counterclockwise with it. The pawl 50, pivotally mounted on the plate 48, is carried bodily along with it. At first, during about 220 degrees of rotation, the counterclockwise motion of the shaft and the plate 48 do not cause any motion of the blade opening pawl or link 46'', thereby allowing an operating interval during which the reflex mirror in the camera can be shifted from exposure position to viewing position, as previously explained. After about 220 degrees of angular rotation, the operating edge 50b' of the pawl makes contact with the lug 40a on the plate 40', but because of the angle at which this edge 50b' is placed, the contact serves to swing the pawl 50a in a counterclockwise direction on its pivot 48b, and it slides over the ear 40a without causing rotation of the plate 40'. Then, upon slight further rotation of the shaft 36c and entraining disk 48, the entraining arm 48a on the disk reaches the lug 40a on the plate 40', and carries the plate along with it. As a consequence, the opening pawl or link 46'' is now moved, so as to engage the arm 13a of the blade ring and open the shutter blades. When the entraining arm 48a first reached the lug 40a and began to move the plate 40', the lugs 46g'' on the pawl 46'' was in a position to engage the corner of the arm 50b of the pawl 50, preventing the pawl from making latching engagement with the lug 40a. But as the plate 40' turns and the pawl 46'' moves leftwardly, the lug 46g'' thereon is moved leftwardly away from the vicinity of the pawl 50, thereby allowing the spring 52 to swing the pawl clockwise on its pivot 48b so that the latching or entraining edge 50b''' of the pawl makes latching engagement with one side of the lug 40a while the arm 48a is engaged with the other side of the lug, thereby positively latching the lug 40a on the plate 40' to the disk 48. In this way, there is established a positive engagement between the parts 48 and 40'.

When the shutter is released to make the next exposure, the shaft 36c turns clockwise as already described in connection with the previous embodiment. The entraining edge 50b''' of the pawl 50 is already engaged with the lug or ear 40a of the plate 40', as just described, so that there is a positive connection and the clockwise rotation of the shaft 36c turns the plate 40' clockwise in a positive manner, drawing the blade opening link or pawl 46" rightwardly in a positive manner, without having to rely upon the force of the spring 45. Thereby the shutter blades are positively and quickly closed, ready for the moving of the reflex mirror and the making of the actual exposure. When the pawl reaches its limit position, determined by the engagement of the edges 46h'' and 46b with the pins 47a and 47b, respectively, the rightward motion of the pawl 46" stops and the pawl becomes completely separated from the arm 13a of the blade ring. Just before this limit position is reached, the operating edge 50b'' of the pawl 50 makes contact with the lug 46g'' on the pawl 46'', thereby turning the pawl 50 on its pivot 48b against the force of its spring 52, to release the engagement of the entraining edge 50b''' with the lug 40a. This breaks the positive connection between the shaft 36c and the plate 40', and the plate 40' is held in its limit position by the spring 45, while the shaft 36c and entraining disk 48 continue their clockwise rotation in a running down direction, during which movement the reflex mirror is shifted from viewing position to exposure position, as previously described in connection with the previous embodiment. The exposure is then made, by operation of the master member 16, and at the completion of the exposure the shaft 36c turns again in a counterclockwise direction to open the shutter blades again to the viewing position (after the reflex mirror has been safely moved to viewing position) as above described.

This third embodiment of the invention has the advantage that there is a positive coupling between the entraining disk 48 and the plate 40' of the blade opening mechanism, both during the blade opening movement and during the blade closing movement. The positive coupling provided by the pawl 50 becomes effective practically at the beginning of the leftward movement of the blade opening pawl or link 46'', and remains in effect thereafter until the end of the rightward closing movement of the link 46'', so that there can be no lost motion or play between these parts at any stage of either the opening movement or closing movement of the blades. Nevertheless, the coupling is so designed that when the closing motion of the link 46'' has been completed, the coupling is disconnected so that the shaft 36c and entraining disk 48 are free to perform the other parts of their movements in a completely uncoupled condition, so far as the blade opening mechanism is concerned.

All embodiments of the invention provide a simplified and sturdy construction for opening the shutter blades for inspection. In addition to the special advantages present in certain embodiments of the invention, all of the embodiments have the general or generic advantage that the blade opening mechanism acts directly upon an arm 13a of the blade ring which lies in the same plane as the main ring-like part of the blade ring. The opening and closing forces exerted on the blade ring by engagement of the end of the arm in the hole in the flange of the opening pawl or link, are forces which, being directly in the plane of the blade ring, do not tend to twist or tilt the blade ring and do not cause it to bind or have undue friction against other parts of the mechanism, thus avoiding the torsional or twisting stresses which occur with certain other forms of blade opening mechanism, wherein the opening and closing forces are applied to pins or arms which project in an axial direction from the plane of the blade ring. In addition to avoiding undesirable twisting forces which tend to distort the blade ring from its true plane, the present invention also provides a construction which is suitable for use with interchangeable lenses. Also, the features of the invention disclosed in connection with FIG. 4 of the drawings make this part of the invention particularly useful with cameras in which the shutter speed is regulated automatically rather than manually, because the force or power available for automatic regulation is ordinarily considerably less than the power which can be manually applied to change a shutter speed setting, so that the reduction of friction during the speed setting movement is especially desirable when automatic setting or regulation is to be employed.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter for use with a camera of the type having operating mechanism for opening shutter blades for viewing purposes between successive exposures, said shutter including a blade ring rotatable in one direction to open shutter blades and rotatable in a reverse direction to close the shutter blades, a master member movable through a running down movement from a tensioned position to a rest position and effective during such movement first to turn said blade ring in an opening direction and then to turn said blade ring in a closing direction, retarding gear train means for delaying the running down movement of said master member, said retarding gear train means including an escapement wheel and a vibrating anchor member pivotally mounted on an adjusting lever and shiftable by movement by said adjusting lever into deeper or shallower engagement with said escapement wheel, spring means tending to move said adjusting lever to a position of maximum engagement of said anchor with said escapement wheel, cam means engageable with a portion of said adjusting lever to determine the depth of engagement of said vibrating anchor with said escapement wheel, and a rotary operating member rotatable from operating mechanism within the camera, characterized by a blade opening link movable by rotation of said operating member in one direction to engage said blade ring and open the shutter blades independently of said master member and movable by rotation of said operating member in an opposite direction to move said blade ring back to a blade-closed position, and disconnecting means operable by movement of said operating member for moving said adjusting member out of contact with said cam means and holding it out of contact therewith while said blade ring is held in a blade open position by said operating member.

2. Mechanism for opening the shutter blades of a photographic shutter for viewing purposes, said mechanism including a blade ring rotatable in one direction to open the blades and rotatable in a reverse direction to close the blades, said blade ring having an arm extending outwardly away from the center of the shutter in a generally radial direction and lying substantially in the same plane with the remainder of the ring, a pawl having a portion containing an opening of a size to receive the outer end of said arm on said blade ring, a rotary shaft for moving said pawl in the general directions of rotary movement of said arm on said blade ring, guiding means effective to shift said portion of said pawl inwardly into embracing relation to the outer end of said arm so that said arm is engaged in said opening in said pawl, near the beginning of movement of said pawl in a blade-opening direction and effective to shift said portion of said pawl outwardly to disengage it from the outer end of said arm near the end of a reverse movement of said pawl in a blade-closing direction, an entraining arm fixed to said shaft to turn therewith, a plate rotatably mounted on said shaft and pivotally connected to said pawl, and a lug on said plate in position to be engaged and positively driven by said entraining arm.

3. A construction as defined in claim 2, in which said lug on said plate is in position to be engaged and positively driven by said entraining arm during rotation of said shaft in one direction, and further including a lug on said pawl in position to be engaged and positively driven by said entraining arm during rotation of said shaft in the opposite direction.

4. A construction as defined in claim 2, in which said lug on said plate is in position to be engaged and positively driven by said entraining arm during rotation of said shaft in one direction, and further including latch means for positively latching said plate in fixed relation to said shaft during rotation of said shaft in the opposite direction.

References Cited by the Examiner
UNITED STATES PATENTS

| | | | |
|---|---|---|---|
| 2,926,575 | 1/1960 | Gebele | 95—42 |
| 3,122,081 | 2/1964 | Singer | 95—42 X |
| 3,151,537 | 10/1964 | Noack | 95—42 |

JOHN M. HORAN, *Primary Examiner.*